United States Patent
Eid et al.

(10) Patent No.: US 9,064,316 B2
(45) Date of Patent: Jun. 23, 2015

(54) METHODS OF CONTENT-BASED IMAGE IDENTIFICATION

(71) Applicant: Lexmark International, Inc., Lexington, KY (US)

(72) Inventors: Ahmed Hamad Mohamed Eid, Lexington, KY (US); Tomasz Jan Cholewo, Lexington, KY (US)

(73) Assignee: LEXMARK INTERNATIONAL, INC., Lexington, KY (US)

( * ) Notice: Subject to any disclaimer, the term of this patent is extended or adjusted under 35 U.S.C. 154(b) by 195 days.

(21) Appl. No.: 13/721,822

(22) Filed: Dec. 20, 2012

(65) Prior Publication Data

US 2014/0003712 A1    Jan. 2, 2014

Related U.S. Application Data

(60) Provisional application No. 61/665,774, filed on Jun. 28, 2012.

(51) Int. Cl.
G06K 9/00 (2006.01)
G06T 7/00 (2006.01)
G06K 9/32 (2006.01)
G06K 9/46 (2006.01)

(52) U.S. Cl.
CPC ............ *G06T 7/0079* (2013.01); *G06K 9/3283* (2013.01); *G06K 9/4647* (2013.01)

(58) Field of Classification Search
CPC .......... H04N 1/00127; H04N 1/00307; H04N 1/00328; H04N 1/00331; H04N 1/00336; H04N 1/00461; H04N 1/00824; H04N 21/4825; H04N 21/8153; G06K 9/00; G06K 9/00288; G06K 9/00442; G06K 9/00463; G06K 9/00483; G06K 9/00624; G06K 9/00664; G06K 9/00711; G06K 9/00979; G06K 9/00993; G06K 9/036; G06K 9/22; G06K 9/228; G06K 9/32; G06K 9/34; G06K 9/38; G06K 9/52; G06K 9/6217; G06K 9/6253; G06K 9/6256; G06K 9/6262; G06K 9/6292; G06K 9/6293; G06K 15/00; G06F 17/00; G06F 17/30; G06F 17/30017; G06F 17/30241; G06F 17/30247; G06F 17/30253; G06F 17/30256; G06F 17/302265; G06F 17/30386; G06F 17/30648; G06F 17/30699; G06F 17/30867; G06F 17/3087; G06F 17/30876

See application file for complete search history.

(56) References Cited

U.S. PATENT DOCUMENTS

| 5,465,353 | A  | * | 11/1995 | Hull et al. ............................. 1/1 |
| 8,050,505 | B2 | * | 11/2011 | Hirohata et al. ............... 382/219 |
| 8,238,614 | B2 | * | 8/2012 | Konishi ........................ 382/112 |
| 8,452,780 | B2 | * | 5/2013 | Graham et al. ................ 707/748 |

OTHER PUBLICATIONS

Jie Chen et al., "WLD: A Robust Local Image Descriptor," IEEE Transactions on Pattern Analysis and Machine Intelligence (PAMI), vol. 32, No. 9, Sep. 2010.

* cited by examiner

Primary Examiner — Jose Couso

(57) ABSTRACT

A method of identifying one or more image features of an image based on content of the image according to one example embodiment includes receiving an image, correcting a distortion and a tone of the image, segmenting the corrected image and extracting the one or more image features, generating an input image descriptor based on the one or more extracted image features, matching the input image descriptor with a reference image descriptor, and performing an action based on the matched reference image descriptor.

15 Claims, 8 Drawing Sheets

| | Image 205a | Image 210a | Image 215a | Image 220a |
|---|---|---|---|---|
| Image 205a | 1.00 | 0.9757 | 0.4561 | 0.4767 |
| Image 210a | 0.9757 | 1.00 | 0.4832 | 0.4896 |
| Image 215a | 0.4561 | 0.4832 | 1.00 | 0.9630 |
| Image 220a | 0.4767 | 0.4896 | 0.9630 | 1.00 |

Table of Matching Scores

FIG. 5

| | Image 805 | Image 810 |
|---|---|---|
| Image 800 | 0.5950 | 0.6527 |

Table of Matching Scores

Table for OCR results of License Plates

METHODS OF CONTENT-BASED IMAGE IDENTIFICATION

CROSS REFERENCES TO RELATED APPLICATIONS

This application claims priority to U.S. Provisional Patent Application Ser. No. 61/665,774, filed Jun. 28, 2012, entitled "Methods of Content-Based Image Identification," the content of which is hereby incorporated by reference in its entirety.

BACKGROUND

1. Field of the Disclosure

The present disclosure relates generally to image identification and more particularly to content-based image identification.

2. Description of the Related Art

Documents, such as forms, identification cards and business cards, may be captured using imaging devices such as, for example, mobile device cameras. Images containing these documents may contain relevant information which may be used to determine how to handle these images.

However, there is no existing solution that analyzes these images, extracts salient features from the images to determine the type of document in or the content of the images, and performs an action based on the content of the images. There is no current solution that reads the images to identify the nature of the documents captured in the images and executes one or more relevant applications based on the documents in the images such as, for example, automatic routing of the images to an appropriate storage location, printing the image or the document captured in the image, retrieving stored information regarding the image, among many others.

Thus, there is a need for a method that can extract significant document features from images that contain one or more captured documents and use these document features to gather an insight to the nature of these documents. There is a need for a method that retrieves information associated with the one or more captured documents automatically from a storage module such as, for example, a database, using the extracted features. There is a need for a method that may extract features from the one or more captured documents and perform an action associated with the extracted features.

SUMMARY

A system capable of and methods for content-based image identification for mobile image capture are disclosed. In one example embodiment, the method of identifying one or more image features based on image content may include receiving an image, correcting a distortion of the image, correcting a tone of the image, segmenting the corrected image and extracting the one or more image features, generating an input image descriptor based on the one or more extracted image features, matching the input image descriptor with a reference image descriptor and performing an action based on the matched reference image descriptor.

In one aspect of the first example embodiment, the received image may be captured by a mobile device. In another aspect, correcting the tone of the image may include performing local image analysis to determine a document background of the image and contrast values in the image. In yet another aspect, the method may include applying varying tone correction in different areas of the image.

In another aspect of the first example embodiment, correcting the tone of the image may include remapping areas in the image to a same constant value. In yet another aspect, segmenting the corrected image may include segmenting the image into one of a foreground and a background class. In yet another aspect, the method may include analyzing the foreground class to define at least one connected component. In another aspect of the example embodiment, the method may include classifying the at least one connected component into one of a text and a non-text component. In an alternative aspect, the method may include classifying the image into one of an edge and a non-edge image content.

In another aspect of the first example embodiment, the input image descriptor may be a histogram of percentage area of each connected component relative to the areas corresponding to a bounding box of the connected component. In an alternative aspect of the example embodiment, the input image descriptor may be a histogram of a count of gradient magnitudes at different angles. In yet another aspect, the input image descriptor may be identified textual information from the image. In one aspect of the example embodiment, the identified textual information may be recognized characters from optical character recognition performed on the image.

In one aspect of the example embodiment, the action performed based on the matched reference image may be retrieving stored information corresponding to the input image descriptor identified from the image.

BRIEF DESCRIPTION OF THE DRAWINGS

The above-mentioned and other features and advantages of the present disclosure, and the manner of attaining them, will become more apparent and will be better understood by reference to the following description of example embodiments taken in conjunction with the accompanying drawings. Like reference numerals are used to indicate the same element throughout the specification.

FIG. 5 illustrates an alternative example embodiment of content-based image identification for identifying documents captured in an image, in conjunction with the method in FIG. 1.

DETAILED DESCRIPTION

Figure 1:
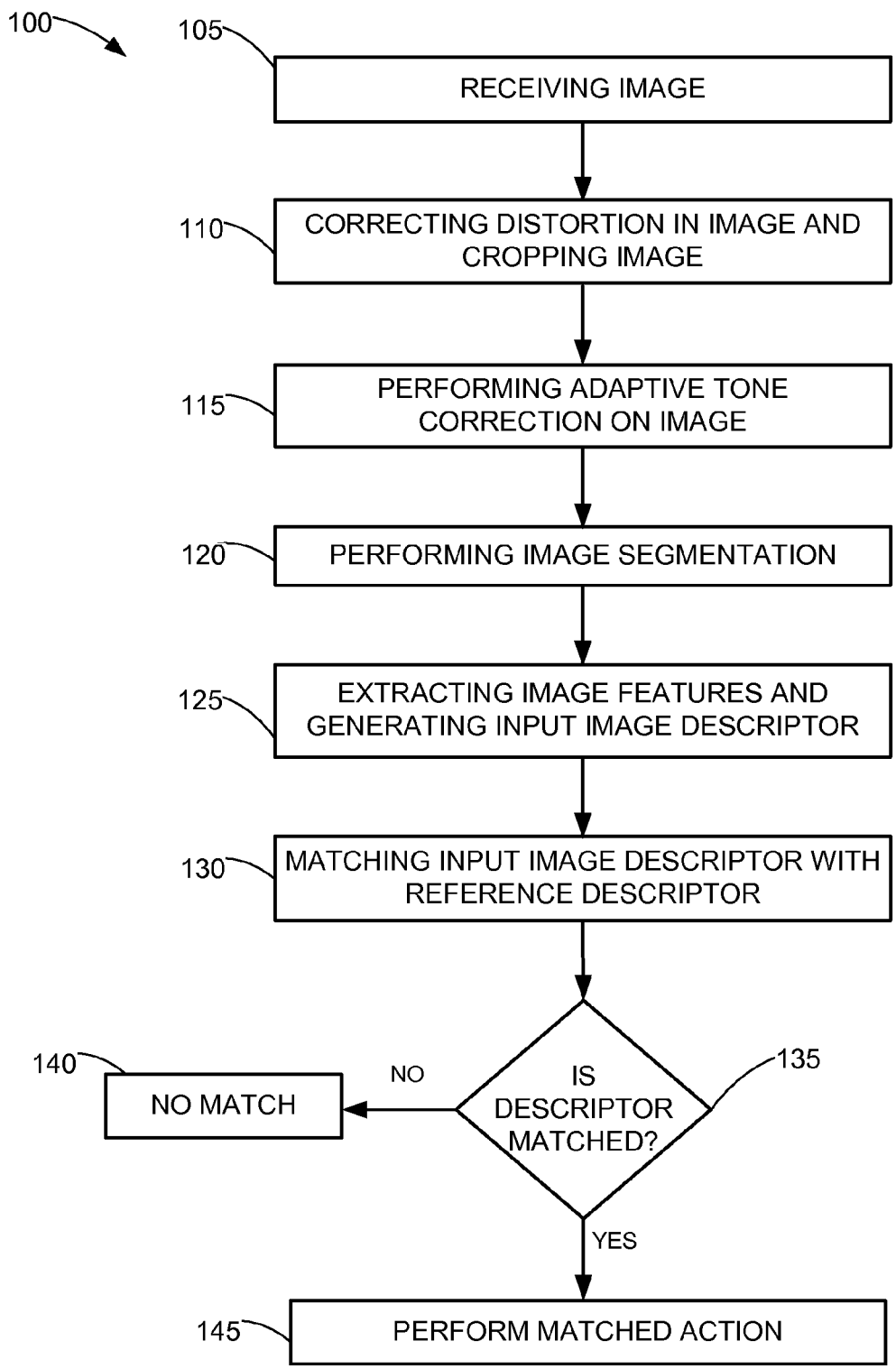
FIG. 1 is a flowchart depicting a method according to one example embodiment for content-based image identification.

It is to be understood that the disclosure is not limited to the details of construction and the arrangement of components set forth in the following description or illustrated in the drawings. The disclosure is capable of other embodiments and of being practiced or of being carried out in various ways. For example, other embodiments may incorporate structural, chronological, process, and other changes. Examples merely typify possible variations. Individual components and functions are optional unless explicitly required, and the sequence of operations may vary. Portions and features of some example embodiments may be included in or substituted for those of others. The scope of the application encompasses the appended claims and all available equivalents. The following description is, therefore, not to be taken in a limited sense, and the scope of the present disclosure is defined by the appended claims.

Also, it is to be understood that the phraseology and terminology used herein is for the purpose of description and should not be regarded as limiting. The use herein of "including," "comprising," or "having" and variations thereof is meant to encompass the items listed thereafter and equivalents thereof as well as additional items. Unless limited otherwise, the terms "connected," "coupled," "mounted," and variations thereof herein are used broadly and encompass direct and indirect connections, couplings, and mountings. In addition, the terms "connected" and "coupled" and variations thereof are not restricted to physical or mechanical connections or couplings. Further, the terms "a" and "an" herein do not denote a limitation of quantity, but rather denote the presence of at least one of the referenced item.

In addition, it should be understood that embodiments of the disclosure include both hardware and electronic components or modules that, for purposes of discussion, may be illustrated and described as if the majority of the components were implemented solely in hardware.

It will be further understood that each block of the diagrams, and combinations of blocks in the diagrams, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus may create means for implementing the functionality of each block or combinations of blocks in the diagrams discussed in detail in the descriptions below.

These computer program instructions may also be stored in a non-transitory computer-readable medium that may direct a computer or other programmable data processing apparatus to function in a particular manner, such that the instructions stored in the computer-readable medium may produce an article of manufacture including an instruction means that implements the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus implement the functions specified in the block or blocks. Output of the computer program instructions, such as the process models and the combined process models, as will be described in greater detail below, may be displayed in a user interface or computer display of the computer or programmable apparatus that implement the functions or the computer program instructions.

Disclosed are a system and methods for identifying features of a document captured by a mobile device based on image content. The method may include correcting the geometrical distortion associated with alignment of the captured document relative to the camera and camera lens aberrations. The tonal values of the captured image may then be modified to compensate for uneven illumination of the document in the image and improve the uniformity of an assumed document background. The corrected image may then be segmented to extract image features such as, for example, edges, foreground objects, connected components, and/or text objects. An image descriptor corresponding to the extracted image features may use a compact set of the image features to effectively describe the image. Using the image descriptor, a matching reference image descriptor from a set of reference image descriptors may be identified and, using the information associated with the matching reference image descriptor, one or more actions may be performed. The matching reference image descriptor may represent an image having substantially similar features or content as those of the input image.

The document in the image may refer to one or more significant features in the image which may be distinguished from the background or from other relatively insignificant objects in the image. Documents that may be captured in the image may include, for example, forms, business cards, identification cards, license plates, among many others. Using the methods that will be described in greater detail herein, the documents captured in the image may be identified, extracted, and may be used to perform an action or retrieve stored information using a matching reference image descriptor.

The methods disclosed may be computer program instructions executed by a processor of a computing device such as, for example, a mobile device. The mobile device may also be any form of computing device that may execute a function such as, but not limited to, a personal computer, an image-capturing device such as a digital camera or a document scanner, a tablet computer, a smartphone, an image-forming device such as a printer or any other device that includes a processor and a computer-readable medium, such as a random access memory (RAM), coupled to the processor. The processor may execute computer-executable program instructions stored in the memory.

FIG. 1 is a flowchart depicting an example embodiment of a method 100 for content-based image identification. At block 105, an image may be received. Receiving an image may include receiving an image captured by a mobile device. The mobile device may capture an image using a camera installed within the mobile device or connected to the mobile device by means of a communications interface.

In another alternative example embodiment, the image may be received by another application running in the mobile device. Receiving the image for processing may include receiving an image that has been uploaded to or downloaded by the mobile device from another application in the mobile device. In another alternative example embodiment, the image may be uploaded to or downloaded by the mobile device from another device connected to the mobile device. Other sources of the image received by the computing device performing the method 100 in FIG. 1 may be known in the art.

The image received for processing may be obtained from a number of sources such as, for example, images scanned by a scanner, stored on fixed or portable computer-readable storage media, optical drives, storage devices accessed from media attached to a communication port of a mobile device, or accessed from a network (e.g., a LAN, WAN or the Internet).

At block 110, geometric correction and cropping may be performed on the image. Images captured using cameras such as, mobile device cameras, may experience different types of image distortion such as, for example, perspective or keystone distortion which may occur due to the central projection nature of the imaging device used to capture the image. The images may contain features having known geometry such as, for example, documents, identification cards, business cards, license plates, among others. These images may benefit from corner detection methods to find the distortion model. The distortion model may then be inverted to restore the object shape, thereby correcting the distortion in the image.

Automatic corner detection methods for identifying corners and finding a distortion model of the image may be, for example, Harris corner detection method and minimum Eigenvalue technique. In one example embodiment, the distortion model may be found by using eight degrees of freedom projective transformation. Other corner detection methods that may be used to identify corners and find the distortion model of the image will be known in the art.

After geometric correction of the image to correct distortion, the image may be cropped to a region of interest. The region of interest may include the entire image. In an alternative example embodiment, the region of interest may include specific contents within the image. Cropping the image to a region of interest may be performed to provide an initial bounding box for corner detection techniques to help limit the search area for document corners. The cropping of the image may be performed automatically after the geometric correction. In another alternative example embodiment, the cropping may be performed using user assistance.

At block 115, adaptive tone correction may be performed on the image. Tone correction may modify pixel values of the image in order for the darkest and lightest pixel values to be encoded using the minimum and maximum code values. In an alternative example embodiment, tone correction may convert a color in the original image to a grayscale representation of the pixel luminance values in the original image.

Images, such as those captured using cameras, may be negatively impacted by non-uniform illumination of one or more documents captured in the image. Adaptive tone correction may be performed to execute a local analysis of the document and determine potential background and contrast values. Varying correction may then be applied in different areas of the image based on pixel values.

In an alternative example embodiment, the document background identified in the image may be remapped to a constant value. This allows for a white balance correction in the image when the adaptive tone correction operation is performed on all three channels of an image such as, for example, an RGB image.

At block 120, image segmentation may be performed on the image. Image segmentation may be performed to simplify the image and convert a representation of the image into a format that may be easier to analyze in conjunction to the example embodiment of the present disclosure. Image segmentation may be performed to assign a value or a label to pixels of the image such that pixels having substantially the same values or labels may share one or more visual characteristics.

In an example embodiment, image segmentation may be a binarization of an image from a grayscale representation to black and white. For example, pixel values in the image having dark luminance may be represented by a black pixel, while pixel values having a light luminance may be represented by a white pixel.

Different segmentation algorithms for segmenting the image may be used such as, for example, the Otsu binary segmentation algorithm. Other segmentation algorithms that may be applied on the image will be known in the art.

In an example embodiment, the image may be segmented into one of a foreground and a background class. The background class may be one or more regions in the image containing a background of the image. The foreground class may be a region in the image that may be toward the front or may be nearest to the viewer. The foreground class may be an area in the image containing significant features that may be useful in identifying one or more documents in the image. The foreground class determined based on the image segmentation process applied may then be analyzed to define one or more connected components in the image.

Connected components may be pixels that are grouped together based on pixel connectivity. For two pixels to be connected, and therefore part of a connected component, the pixels have to fulfill one or more conditions such as, for example, conditions on one of pixel brightness and spatial adjacency. For two pixels to be part of a connected component, their pixel values may share the same set of intensity values X. For example, using a grayscale image, X may be any range of gray levels, e.g. $X=\{22, 23, \ldots 40\}$. Using a binary image as another illustrative embodiment, X may have bi-tonal values (e.g., 0's and 1's). Other conditions for pixel connectivity and connected components labeling will be known to one of ordinary skill in the art.

In one example embodiment, the connected components may be classified into one of a text and non-text components. In another example embodiment, the image may be classified into edge and non-edge contents using, for example, the Sobel edge detector. Edge detection algorithms, as will be known in the art, may also be used to identify and classify contents in the image into edge and non-edge contents.

At block 125, image features may be extracted and an image descriptor may be generated corresponding to the one or more extracted image features. In an example embodiment, some features may be extracted from the connected components generated using image segmentation. An image descriptor may then be generated based on the extracted one or more features from the image.

The image descriptor may be a set of values that pertains to distinctive features about the extracted contents of the image or one or more descriptions of the extracted image features from contents of the image. In an example embodiment, image descriptors may describe basic characteristics of the visual features in the image such as, for example, a shape, a texture, an outline that may be formed by one or more edges, characters corresponding to the identified connected components, image gradient magnitudes, angles, among many others.

In one example embodiment, a first image descriptor may be a histogram of a percentage area of each connected component relative to an area of the bounding box. The first image descriptor may be invariant to scaling differences and to degrees of rotation such as, the basic 90, 180 and 270 rotational degrees.

In an alternative example embodiment, a 2D histogram may be generated based on gradient magnitude and angles of the image. A count of gradient magnitudes at different angles may be used to construct the 2D histogram. In an example embodiment, the rows of the 2D histogram may be concatenated to form a 1D histogram, thereby generating a second image descriptor. For example, normalized gradient magnitude $m_g(x,y)$ of an input image, having a defined gradient magnitude and angle at each pixel, may be in the range −1 to 1 and angle $\theta_g(x,y)$, where $0 \le \theta_g(x,y) \le 2\pi$. With an appropriate selection of the number of histogram bins and intervals for gradient magnitudes and angles, a 2D histogram may be constructed. The 2D histogram may be a 2D array that has the count (i.e. frequency of occurrence) of certain magnitudes at certain angles.

For example, a 2D histogram $H_2(i,j)$, where i may refer to a gradient magnitude, an index to a gradient magnitude, a histogram bin, or a center of histogram interval of gradient magnitudes, and j may refer to an angle, an index to an angle, a histogram bin or a center of histogram interval of gradient angles, may be represented as shown in Table 1.

TABLE 1

Example 2D histogram

| i/j | $\pi/3$ | $\pi$ | $5\pi/3$ |
|---|---|---|---|
| −1/3 | 5 | 11 | 25 |
| 0 | 18 | 2 | 0 |
| 1/3 | 10 | 1 | 3 |

This 2D (3×3) histogram may be viewed as 1D histogram (with 9, i.e. 3×3, entries) as $H_1(k)$=[5, 11, 25, 18, 2, 0, 10, 1, 3]

where $H_1(1)=H_2(-\frac{1}{3}, \pi/3)=5, \ldots H_1(5)=H_2(0, \pi)=2, \ldots H_1(9)=H_2(\frac{1}{3}, 5\pi/3)=3$.

Plotting $H_1$, the y-axis may be the count (i.e. frequency of occurrence), and the x-axis may be index to (magnitude, angle) pair.

In another example embodiment, text extracted from a region of interest in the image may be used as a third image descriptor. The text may be extracted using known methods of recognizing one or more characters from an image such as, for example, optical character recognition.

The type of image descriptor to be used may be based on a determined type of document contained in the image. For example, if the image is identified to contain a card such as business cards and photo IDs, the first image descriptor may be used to describe the image features extracted from the card captured in the image. For form identification and subsequent matching, as will be described in greater detail below, the second image descriptor, which is a 2D histogram of image gradient magnitudes and angles may be used as the image descriptor. In another alternative example embodiment, wherein significant features in the image contain one or more characters, recognized characters identified using optical character recognition may be used as the image descriptor.

At block 130, the one or more image features, represented by the image descriptor, may be matched to a set of reference image descriptors. Reference image descriptors may be a stored set of image descriptors that may be used to compare the input image descriptor. The reference image descriptors may be a set of known and/or arbitrary image descriptors that describe a known image that contains a corresponding set of information or action.

In an example embodiment, reference image descriptors may be pre-generated and stored in a storage device. The storage device may be a remote storage location such as, for example, a database server.

The input image descriptor, which refers to the image descriptor generated at block 125 corresponding to the one or more extracted features in the image, may then be matched to the stored reference image descriptors. One method to match the input descriptor $H^i$ to the reference descriptor $H^r$ if may include the use of the following formula:

$$m(H^i, H^r) = \sum_{k}^{N} \min[(H^i)(k), H^r(k))$$

where, $$\sum_{k=1}^{N} H^i(k) = \sum_{k=1}^{N} H^r(k) = 1$$

The matching score m ranges from 0 to 1, where 0 means that no match has been found and 1 means that a perfect match has been found.

In one example embodiment, the level of matching between two or more images may be determined using one or more predefined thresholds. For example, if the threshold is set to 0.85, matching scores below 0.85 may be considered as no match and reference image descriptors having matching scores above 0.85 may be considered as potential matches. In an alternative example embodiment, the threshold value may be customizable by a user.

In an alternative example embodiment, maximum matching may be used to identify the best match for the input image descriptor. In maximum matching, the reference image descriptor having the highest matching score out of all the other reference image descriptors in the database may be considered as the best match for the input image descriptor.

In yet another alternative example embodiment, the correlation coefficient may be used as another matching criterion. In this example embodiment, the correlation coefficient may determine the closest matching reference image descriptor. The correlation coefficient between the reference image descriptor $X^r$ and the input image descriptor $X^i$ may be defined as:

$$\rho = \frac{COV(X^r, X^i)}{\sigma_{X^r} \sigma_{X^i}}$$

where $COV(X^r, X^i)$ is the covariance of $X^r$ and $X^i$, and $\sigma_{X^r}$ and $\sigma_{X^i}$ are the corresponding standard deviations of $X^r$ and $X^i$, respectively. The value of $\rho$ approaches 1 when $X^r$ and $X^i$ have high similarity.

The type of matching scores to be used for determining the matching reference descriptor may be based on the type of image descriptor which, in turn, may be related to the type of the application or document to be identified from the image. For example, thresholding, or using the threshold value to determine the matching image, may be used to find a match when two or more histograms are compared. The correlation coefficient may be used to find a matching image descriptor using descriptors that may not necessarily be histograms.

In an alternative example embodiment, the choice of what type of matching score to use (e.g. maximum matching or thresholding) may be set by the user. Determining the matching image descriptor using thresholding may be performed by presenting a list of one or more threshold values for a user to choose from. The list may contain documents that have matching scores that are greater than or equal to the threshold.

At block 135, if a matching reference image descriptor is not found, no match may be declared (at block 140). At block 145, one or more actions may be performed based on the matching reference image descriptor. The action to be performed may be associated with the reference image descriptor and stored along with the reference image descriptor in a storage location such as, a database, as will be known in the art. The action to be performed may be based on the content of the document as specified by the reference image descriptor and will be executed once the matching reference image descriptor is found.

The user of the device executing the method described in FIG. 1 may be notified of the results of the matching. Notifying the user may include displaying a notice in a user interface, and other forms of notification as will be known by those of ordinary skill in the art.

The one or more actions that may be performed may be arbitrary and may be set by a user that defined the reference image descriptors. For illustrative purposes, actions that may be performed once a matching reference image descriptor is found may include retrieving stored information about the identified image, printing the captured image or the document captured in the image, routing the image to a designated path (which may be helpful in form management), triggering an alarm or alert, activating a notification to one or more users or administrators of a system, among many others.

Figure 2:
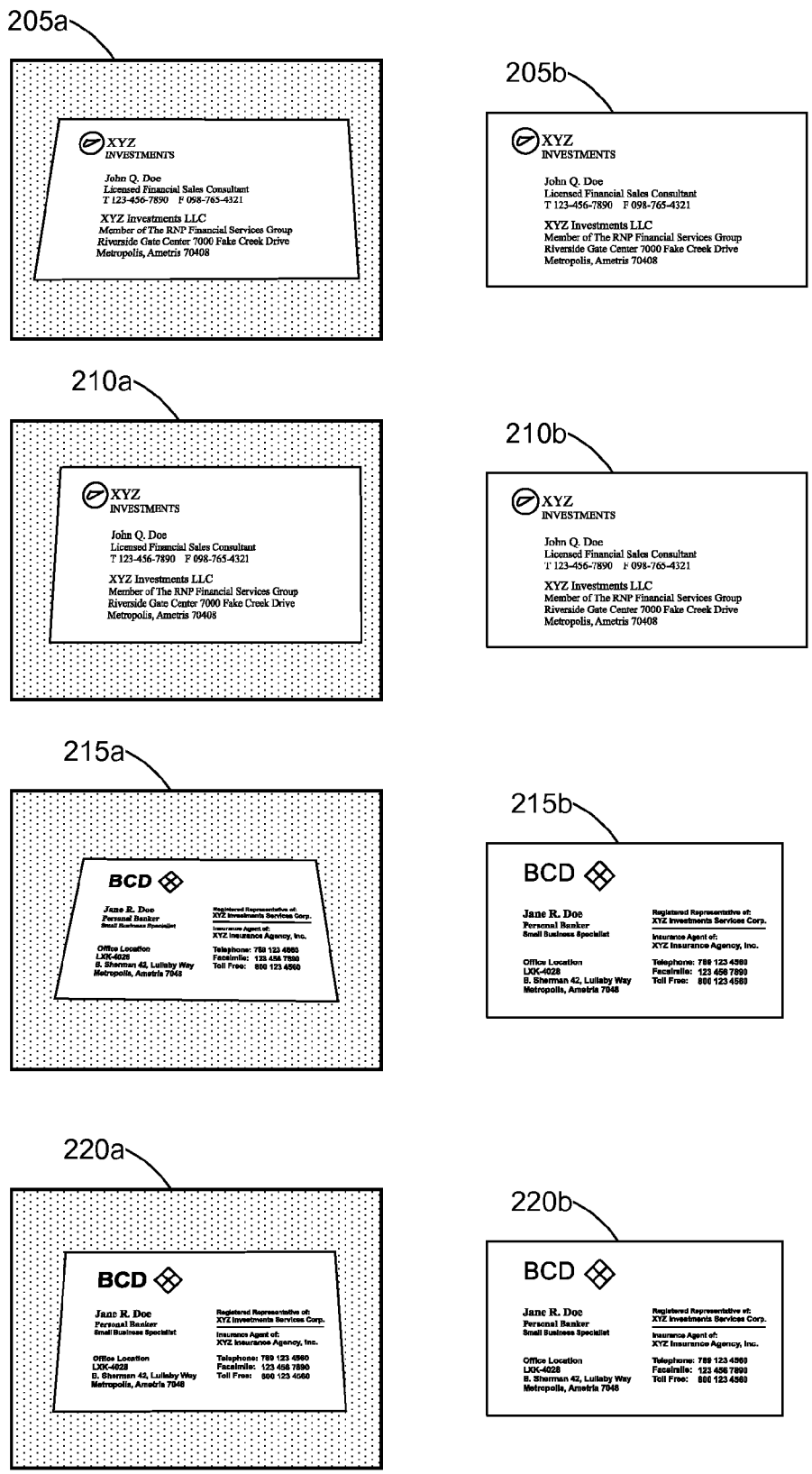
FIG. 2 illustrates a first example embodiment of content-based image identification for identifying documents captured in an image, in conjunction with the method in FIG. 1.

FIG. 2 illustrates an example embodiment of content-based image identification for identifying documents captured in an image, in conjunction with method 100 in FIG. 1. Images 205a, 210a, 215a and 220a may be captured images received by the device performing method 100 of FIG. 1 (at block 105). As an illustrative embodiment, images 205a and 210a may contain a substantially similar image of a document (e.g. business card) captured differently. Similarly, images 215a and 220a may also contain a substantially similar image of another document (e.g. another business card) captured differently.

Capturing differently may refer to capturing images at different angles, thereby generating differences in the captured images such as, for example, different levels of distortion, as shown in the angle or distortion differences of images 205a and 210a, and images 215a and 220a. In an alternative example embodiment, differences between the captured images may include differences in illumination, contrast, color, noise, background brightness, glare, object size, among many others as will be known in the art.

In FIG. 2, corrected images 205b, 210b, 215b and 220b may be original images 205a, 210a, 215a and 220a, respectively, after geometric correction and cropping have been applied. As shown in corrected image 205b, the keystone distortion in image 205a has been corrected and image 205b has been cropped to a region of interest which, in this illustrative embodiment, includes the area containing the document captured in image 205a. Similarly, corrected images 210b, 215b and 220b show distortion correction and cropping performed on original images 210a, 215a and 220a. It will be appreciated that the cropping of the original images to include the document identified in images 205a, 210a, 215a and 220a and exclude the background areas are for illustrative purposes and should not be regarded as limiting.

Corrected images 205b, 210b, 215b and 220b may also have undergone further image processing such as adaptive tone correction and image segmentation, as described in greater detail above, in conjunction with blocks 115 and 120 of FIG. 1.

Figures 3, 4:
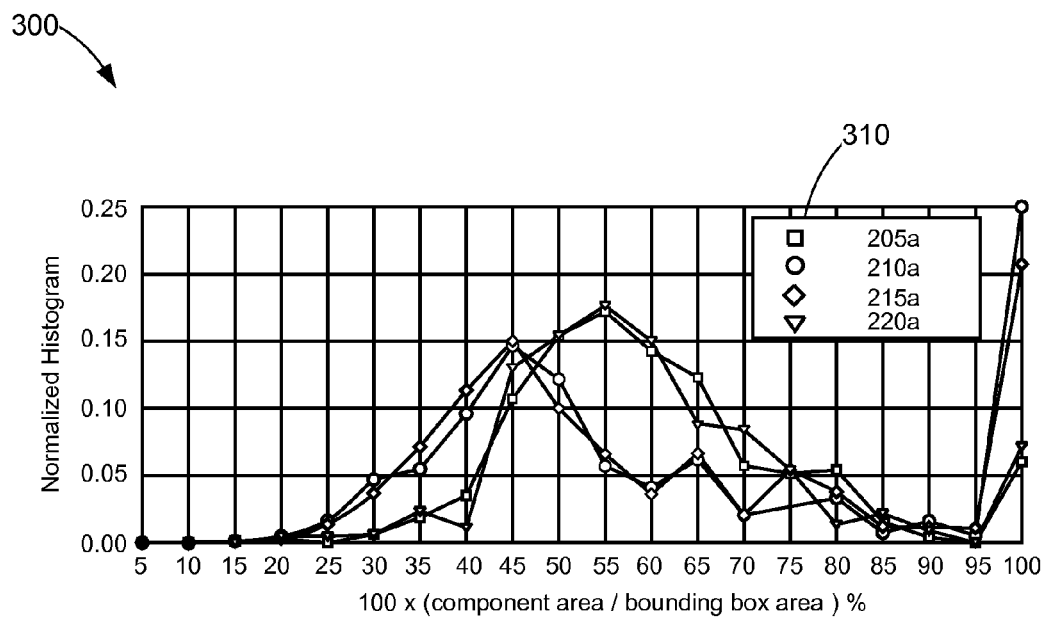
FIG. 3 illustrates a graphical representation of example image descriptors corresponding to images shown in FIG. 2.
FIG. 4 is a table of matching scores between images shown in FIG. 2 based on image descriptors shown in FIG. 3.

FIG. 3 illustrates a graphical representation of example image descriptors corresponding to images 205a, 210a, 215a and 220a in FIG. 2. The image descriptors as shown in legend 310 correspond to image features extracted from the corrected and segmented images 205b, 210b, 215b and 220b in FIG. 2. The image descriptors may be histograms of the percentage area of each of the identified connected component in the segmented images relative to the area of the bounding box used to determine a region of interest in the original images 205a, 210a, 215a and 220a. Using the image descriptors, matching scores will be calculated for each of the images as compared to each other.

FIG. 4 is a table of matching scores between images 205a, 210a, 215a, 220a based on image descriptors, shown in FIG. 3. The matching scores may be generated based on connected components from each of the corrected and segmented images 205b, 210b, 215b and 220b. The matching scores of each of the images may show how closely one image resembles another based on their extracted image features.

For example, images 205a and 215a may be selected to provide reference image descriptors. If at some instance image 210a was the captured image, then it will have a matching score 0.9757 against the reference image 210a and 0.4832 against the reference image 215a. Based on the maximum matching criterion, image 210a may be identified as being of the same type of image 205a. Similarly, if at some instance image 220a was the captured image, then it will have a matching score 0.9630 against the reference image 215a and 0.4767 against the reference image 205a. Based on the maximum matching criterion, image 220a may be identified as being of the same type of image 215a.

Figure 5:
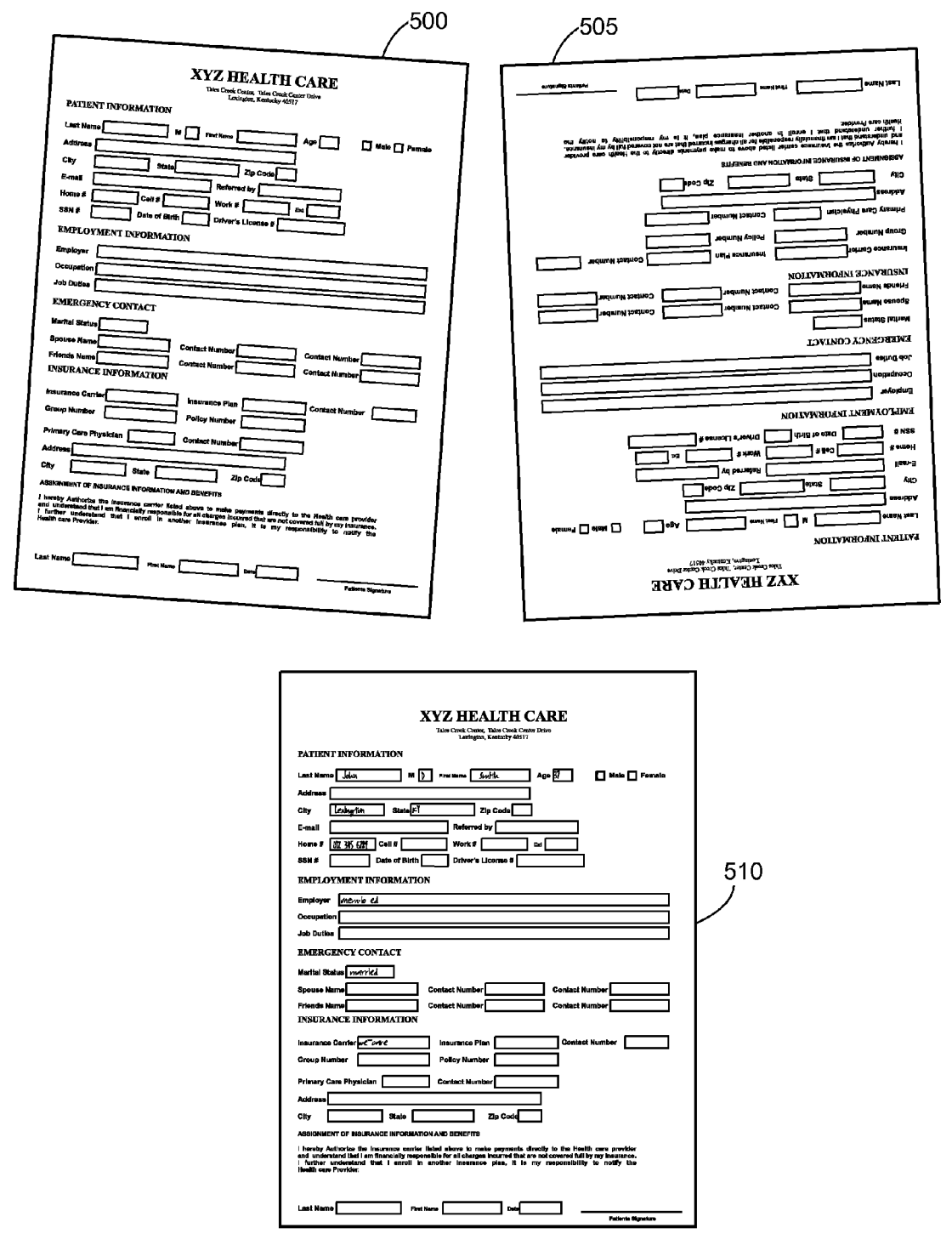

FIG. 5 illustrates an alternative example embodiment of content-based image identification for identifying documents captured in an image, in conjunction with method 100 in FIG. 1. Images 500, 505 and 510 may be images containing a form received by device performing method 100 at block 105. As an illustrative embodiment, images 500 and 505 may contain a substantially similar image of a document (e.g. form) captured differently.

As aforementioned, capturing differently may refer to capturing images at different angles, thereby generating differences in the captured images such as, for example, different degrees of rotation, as shown in image 500 being captured slightly skewed to the left and image 505 substantially rotated by 180 degrees. Image 510 may contain a similar form as those depicted in images 500 and 505, but with some of the text boxes filled in with information. Other differences that captured images containing one or more documents may have will be understood by one of ordinary skill in the art.

Figures 6, 7:
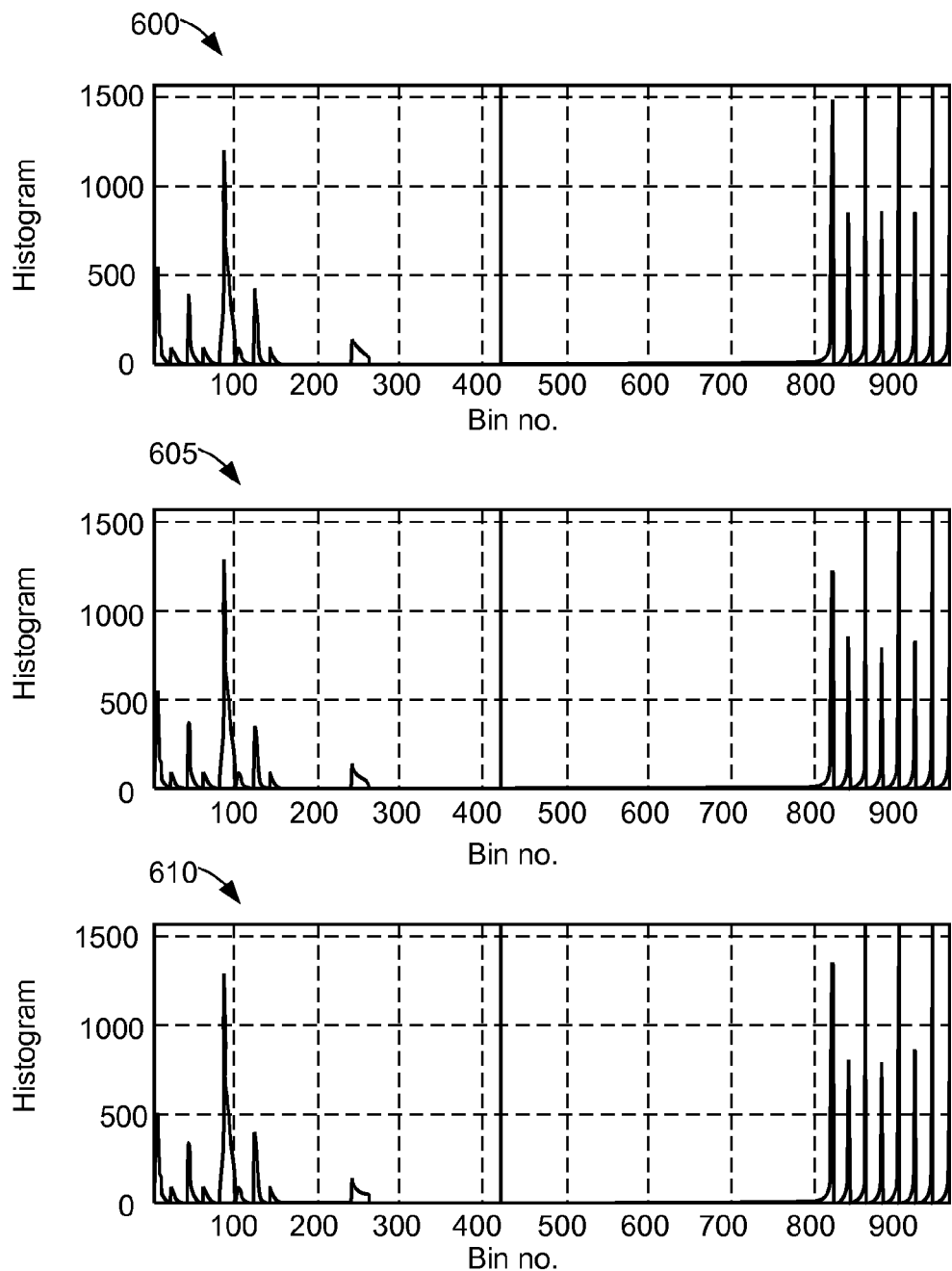
FIG. 6 illustrates a graphical representation of example image descriptors corresponding to images shown in FIG. 5.
FIG. 7 is a table of matching scores between images shown in FIG. 5 and based on image descriptors in FIG. 6.

FIG. 6 illustrates a graphical representation of example image descriptors 600, 605 and 610 corresponding to images 500, 505 and 510, respectively. Image descriptors 600, 605 and 610 may be 2D histograms generated based on image features extracted and analyzed from images 500, 505 and 510, respectively.

FIG. 7 is a table 700 of matching scores between images shown in FIG. 5 and based on image descriptors 600, 605 and 610 in FIG. 6. The matching score between image descriptors 600 and 605 is calculated to be 0.9650 while the matching score between image descriptors 600 and 610 is 0.9599. Image descriptor 600 was chosen as a reference image descriptor and image descriptors 605 and 610 represent two captures of the same document at different conditions or orientations. According to the high matching score between the reference image descriptor 600 and image descriptors 605 and 610, whether maximum or thresholding matching criterion is used, images 605 and 610 may be identified as being of the same document type as image 600.

Figure 8:
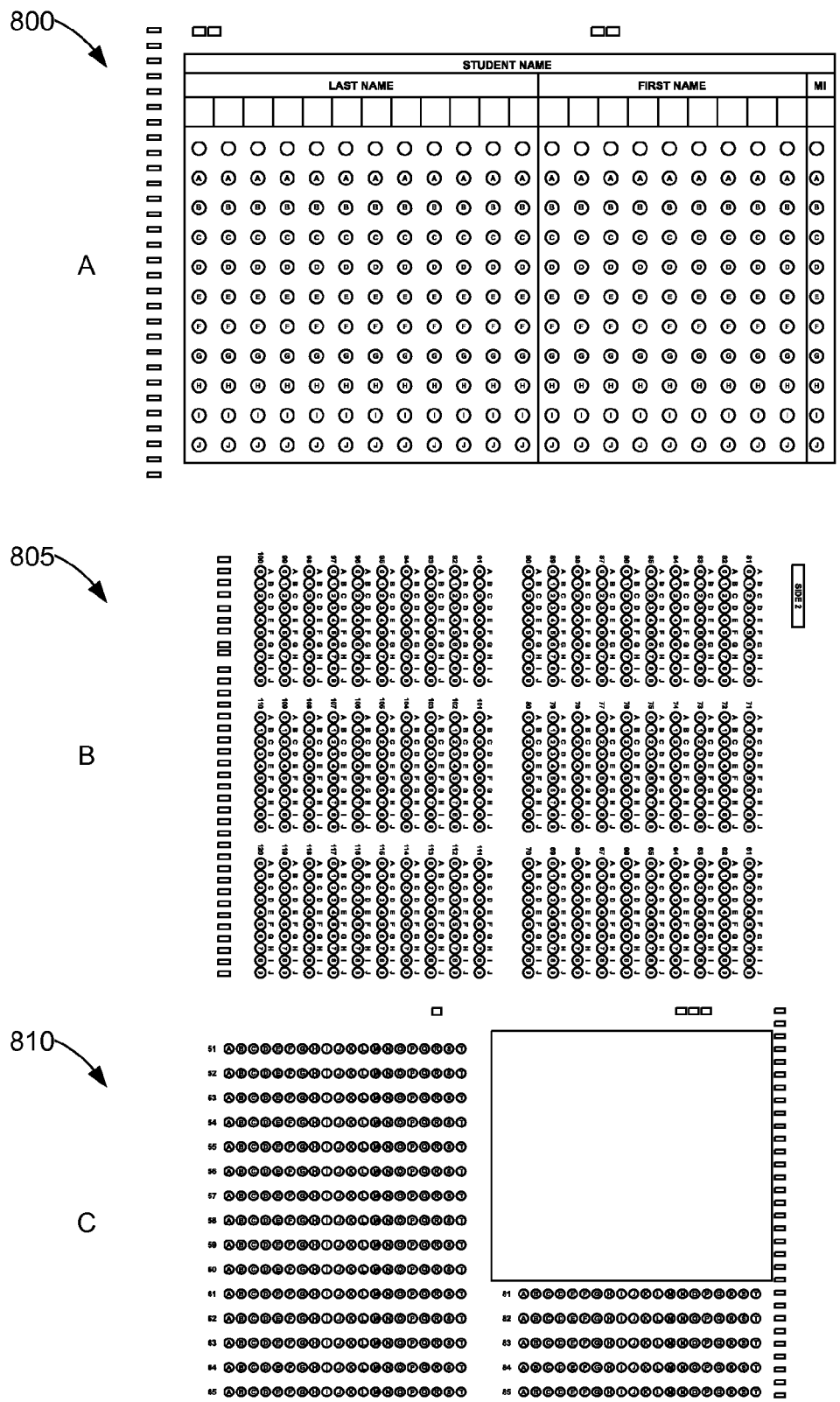
FIG. 8 illustrates another alternative embodiment of content-based image identification for identifying documents captured in an image, in conjunction with the method in FIG. 1.

FIG. 8 illustrates another alternative example embodiment of content-based image identification for identifying documents captured in an image, in conjunction with method 100 in FIG. 1. Images 800, 805 and 810 may be captured images containing a document (e.g. form) after geometric correction, cropping and image segmentation have been applied to their corresponding original input images (not shown).

Figures 9, 10:
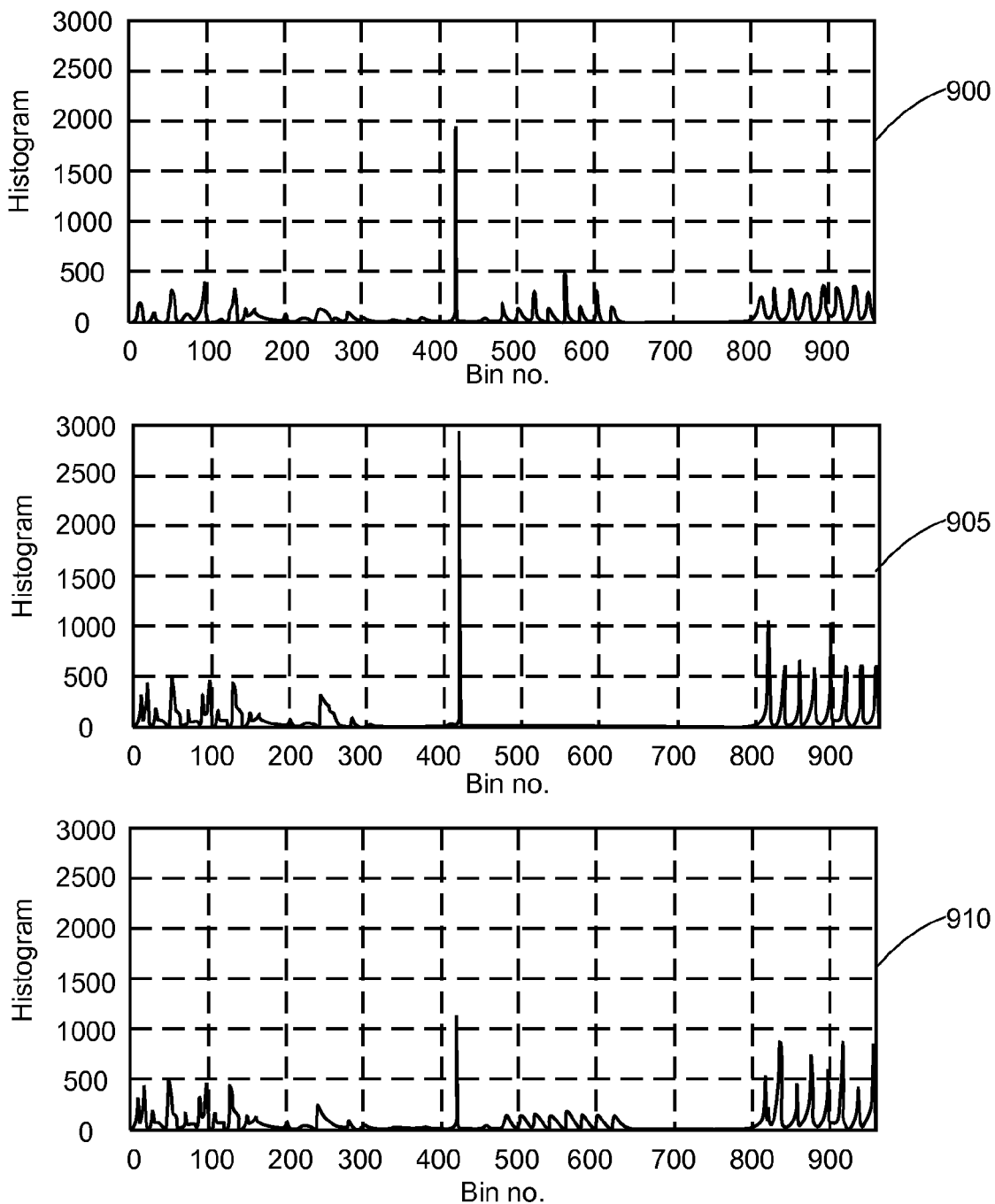
FIG. 9 illustrates a graphical representation of example image descriptors corresponding to images shown in FIG. 8.
FIG. 10 is a table of matching scores between images shown in FIG. 9.

FIG. 9 illustrates a graphical representation of example image descriptors 900, 905, 910 corresponding to images 800, 805 and 810, respectively. Image descriptors 900, 905 and 910 may be 2D histograms generated based on image features extracted and analyzed from images 800, 805 and 810. In this illustrative embodiment, image descriptor 900 corresponding to image 800 may be an input image descriptor, while image descriptors 905 and 910 may belong to a set of reference image descriptors with which image descriptor 900 may be compared against.

FIG. 10 is a table of matching scores between images 800, 805 and 810 in FIG. 8. The matching score between image 800 and image 805 is calculated to be 0.5950 while the matching score between image 800 and 810 is 0.6527. If image 805 and 810 were selected as reference images, and the matching threshold was set to 0.85, the input image 800 may not be declared matched to any of the reference images. Therefore, image 800 may not be identified as being of the same document type of neither image 805 nor image 810.

Figures 11, 12:
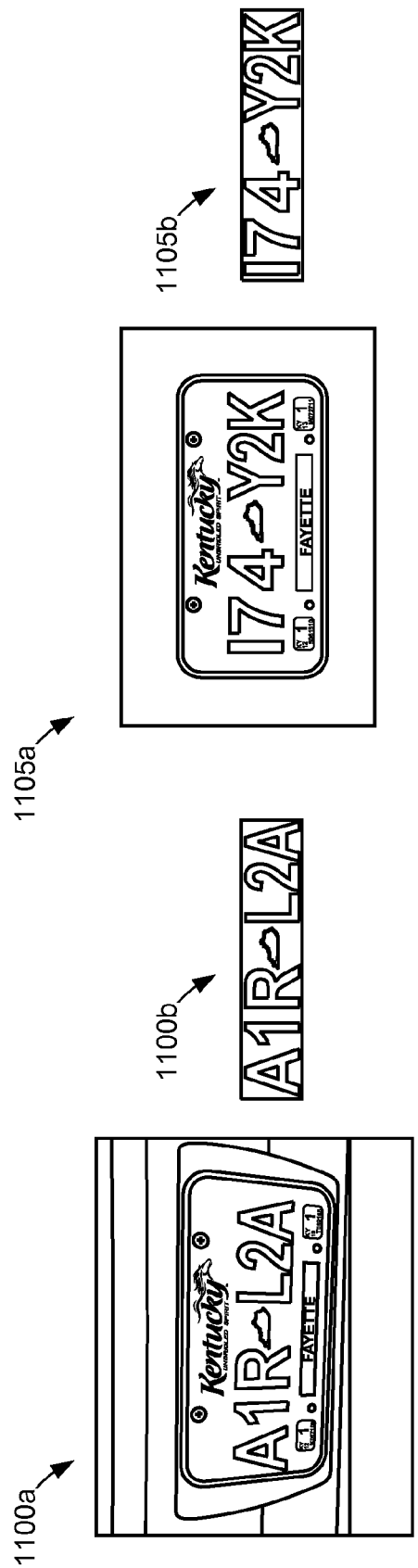
FIG. 11 illustrates another alternative example embodiment of content-based image identification for identifying documents captured in an image, in conjunction with the method in FIG. 1.
FIG. 12 is a table of recognized characters from corrected images shown in FIG. 11.

FIG. 11 illustrates another alternative example embodiment of content-based image identification for identifying documents captured in an image, in conjunction with method 100 in FIG. 1. Images 1100a and 1105a may be captured images containing a document (e.g. license plates) received by device performing method 100 at block 105.

Corrected images 1100b and 1105b may be original images 1100a and 1105b, respectively, after geometric correction, cropping, tone correction and image segmentation have been applied. As shown in corrected image 1100b, distortion in image 1100a has been corrected and the original image has been cropped to a region of interest which, in this illustrative embodiment, may include an area containing the license number with other areas containing relatively insignificant features removed. Similarly, corrected image 1105b shows geometric correction, cropping, tone correction and image segmentation performed on original image 1105a. It will be appreciated that the cropping of the original images to include the license plate identified in images 1100a and 1105a and exclude the background areas are for illustrative purposes and should not be regarded as limiting.

FIG. 12 is a table of recognized characters from corrected images 1100b and 1105b. The recognized characters, as aforementioned, may be determined based on one or more character recognition techniques such as optical character recognition. As shown in the table, the characters from each of the images are recognized correctly. Matching these sets of characters to a database of license plates, an action corresponding to the matching license plate may be retrieved based on a stored license plate from the database having substantially similar characters as to those extracted from corrected images 1100b and 1105b.

It will be appreciated that the actions described and shown in the example flowcharts may be carried out or performed in any suitable order. It will also be appreciated that not all of the actions described in FIG. 1 need to be performed in accordance with the embodiments of the disclosure and/or additional actions may be performed in accordance with other embodiments of the disclosure.

Many modifications and other embodiments of the disclosure set forth herein will come to mind to one skilled in the art to which these disclosure pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of identifying one or more image features of an image based on content of the image, comprising:
   receiving an image at a processor of a mobile device;
   correcting a distortion and a tone of the image with the processor;
   segmenting the corrected image and extracting the one or more image features;
   generating an input image descriptor based on the one or more extracted image features, wherein the input image descriptor is a histogram of a count of gradient magnitudes at different angles;
   matching the input image descriptor with a reference image descriptor; and
   performing an action based on the matched reference image descriptor.

2. The method of claim 1, wherein the received image is captured by the mobile device.

3. The method of claim 1, wherein correcting the tone of the image includes performing local analysis to determine a document background of the image and contrast values in the image.

4. The method of claim 3, wherein correcting the tone of the image further includes applying varying tone correction in different areas of the image.

5. The method of claim 1, wherein correcting the tone of the image includes remapping areas in the image to a same constant value.

6. The method of claim 1, wherein segmenting the corrected image includes segmenting the image into one of a foreground and a background class.

7. The method of claim 6, further comprising analyzing the foreground class to define at least one connected component.

8. The method of claim 7, further comprising classifying the at least one connected component into one of a text and a non-text component.

9. The method of claim 7, further comprising classifying the at least one connected component into one of an edge and a non-edge image content.

10. The method of claim 1, wherein the action performed is retrieving stored information corresponding to the input image descriptor.

11. A method of identifying one or more image features of an image captured by a mobile device based on content of the image, comprising:
    with a processor of the mobile device, segmenting the image into foreground and background and extracting the one or more image features from the foreground of the image;
    defining connected components based on pixel values of the foreground of the image;
    generating an input image descriptor based on the one or more extracted image features, wherein the input image descriptor is a histogram of percentage area of each connected component relative to areas corresponding to a bounding box of the connected component;
    selecting a matching reference image descriptor for the input image descriptor from a plurality of reference image descriptors, the matching reference image descriptor having a highest matching score with the input image descriptor of the plurality of reference image descriptors; and performing a predetermined action based on the matching reference image descriptor.

12. The method of claim 11, wherein the action performed includes retrieving information associated with the extracted image features.

13. The method of claim 11, wherein the action performed includes routing the image to a designated path.

14. The method of claim 1, wherein the action performed includes retrieving information associated with the extracted image features.

15. The method of claim 1, wherein the action performed includes producing a printed output of the image.

* * * * *